United States [19]  [11] 3,922,327
Howden [45] *Nov. 25, 1975

[54] METHOD OF MANUFACTURE OF OPTICAL ELEMENTS
[75] Inventor: Harry Howden, Salfords, England
[73] Assignee: U.S. Philips Corporation, New York, N.Y.
[ * ] Notice: The portion of the term of this patent subsequent to Apr. 8, 1992, has been disclaimed.
[22] Filed: Nov. 1, 1973
[21] Appl. No.: 411,761

[30] Foreign Application Priority Data
Nov. 22, 1972 United Kingdom............... 53952/72

[52] U.S. Cl. ...................... 264/1; 264/162; 264/294
[51] Int. Cl.² .......................................... B29D 11/00
[58] Field of Search ..................... 264/1, 2, 162, 294

[56] References Cited
UNITED STATES PATENTS
2,911,682 11/1959 Ewald ..................................... 264/1
3,211,811 10/1965 Lanman ................................. 264/1
3,497,577 2/1970 Wichterle ........................... 264/162

OTHER PUBLICATIONS
Lemaitre, G., "New Procedure for Making Schmidt Corrector Plates," Applied Optics, Vol. 11, No. 7, July, 1972, pp. 1630–1636.

Primary Examiner—Robert F. White
Assistant Examiner—Gene Auville
Attorney, Agent, or Firm—Frank R. Trifari; George B. Berka

[57] ABSTRACT
A glass blank is adhered to a resin material which is cured in a mould having a surface profile which is a magnified version of a desired optical shape. Shrinkage of the resin material as it cures in the mould deforms the glass blank which in this deformed condition is secured to a mounting block and then released from the mould. The released surface of the glass blank is then worked flat and will assume the desired optical shape when the glass blank is restored by release from the mounting block.

Figure 3:
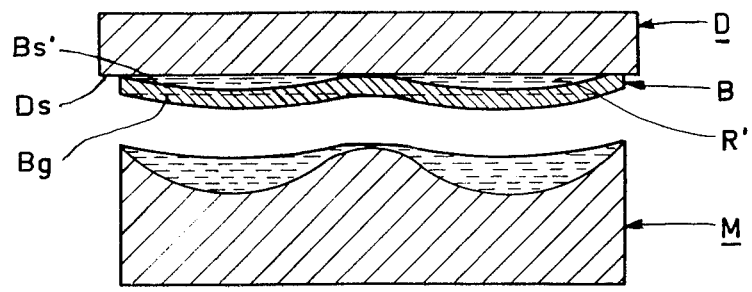

FIG. 3 is best suited for early publication purposes.

9 Claims, 4 Drawing Figures

METHOD OF MANUFACTURE OF OPTICAL ELEMENTS

The invention relates to the manufacture of optical elements.

The manufacture of high quality aspheric and other optical elements in glass can involve lengthy and highly skilled hand working processes.

With a view to eliminating the need for much of this skilled work there is proposed in U.S. patent application Ser. No. 278,116 a method of manufacturing an optical element from a blank of light-transmissive material which consists in supporting the blank with one surface in proximity with a mould surface that has a profile which is a magnification of a required optical profile in a direction normal to said one surface, filling the region between said surfaces with an adhesive resin material that is known to shrink on curing by a predetermined amount, causing the resin material to cure with it adhered to both said surfaces so that the blank is deformed, optically working flat the other, outer, surface of the blank, and releasing the worked blank from the cured resin material, the magnification factor of the mould surface profile being an inverse function of the percentage shrinkage of said resin material, but not being sufficiently large to cause deformation of the blank beyond its elastic limit.

In this above-stated method of manufacturing an optical element, the required optical profile referred to is the mould surface profile, which itself is the negative (times the magnification factor) of the profile that the worked surface of the blank will assume when the blank is released from the cured resin material. As a consequence, as can be seen from FIG. 1 of the application Ser. No. 278,116, the (negative) mould surface profile for a Schmidt corrector plate will have a convex outer rim. Unfortunately, it has been found that the presence of a convex outer rim on the mould surface profile can give rise to practical difficulties in providing a satisfactory seal for maintaining the initially uncured resin material in the region between the mould surface profile and the facing surface of the blank.

The present invention provides a further method for the manufacture of optical elements which involves deformation of a glass blank, or a blank of other suitable light-transmissive material, this further method, in particular, avoiding the use of a mould surface profile with a convex outer rim in the manufacture of a Schmidt corrector plate.

According to the present invention a method of manufacturing an optical element from a blank of light-transmissive material consists in supporting the blank with one surface facing and in contact or in proximity with a mould surface that has a profile, in a direction normal to said one surface, is a magnification of a required optical profile for the optical element, filling the region between said surfaces with an adhesive resin material that shrinks on curing by a predetermined amount, causing the resin material to cure with it adhered to both said surfaces so that the blank is deformed, securing the other, outer, surface of the deformed blank to a supporting surface, releasing said one surface of the blank from the cured resin material, with the blank held deformed by said supporting surface, optically working flat said one surface of the blank, and releasing the worked blank from said supporting surface, the magnification factor of the mould surface profile being an inverse function of the percentage shrinkage of said resin material, but not being sufficiently large to cause deformation of the blank beyond its elastic limit.

In the method according to the invention, the mould surface profile is the same profile (times the magnification factor) as the required optical profile for the optical element, and not the negative of the latter as in the method according to aforementioned application. Consequently, the mould surface profile required for the manufacture of a Schmidt corrector plate does not have a convex outer rim because it is the same (times the magnification factor) as the required corrector plate profile.

The method according to the present invention has the same advantages as the method according to said application Ser. No. 278,116 over the known vacuum frame method referred to in that application. Thus, the method according to the present invention enables much steeper curves to be produced, as compared with the known vacuum frame method, in the manufacture of an optical element, because the pressure that can be exerted on a blank by the adhesive resin material to deform it is far greater than atmospheric pressure. Alternatively, stronger blanks (i.e. with an increased thickness to diameter ratio) can be used to make optical elements because of the increased available pressure. Furthermore, the profile accuracy of an optical element is improved for two reasons. Firstly, the magnified mould surface profile can be shaped accurately, for instance by machining this surface oon one face of a rigid metal block, instead of relying on supports which necessitate extensive calculation and experimentation to obtain the best compromise profile as in the vacuum frame method. Secondly, any errors in the mould surface profile are diminished by the magnification factor in the optical profile of the manufactured optical element.

In order that the present invention may be more fully understood reference will now be made by way of example to the accompanying drawing of which:

FIGS. 1 to 4 illustrate diagrammatically the method of manufacture according to the invention as applied to a Schmidt corrector plate.

Figure 1:
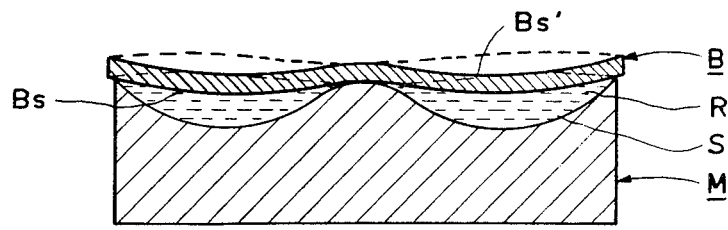
Figure 2:
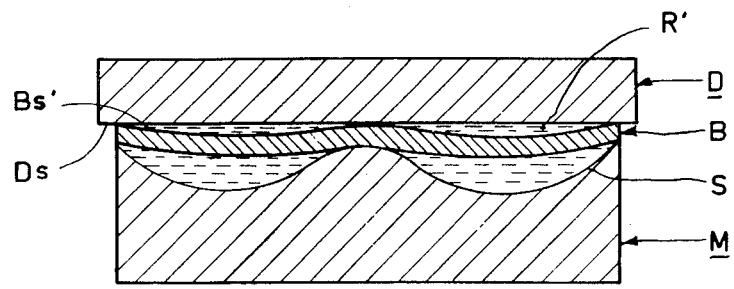

Referring to the drawing, in FIG. 1 a rigid mould block M has a mould surface S that has a profile which is a magnification of a required optical profile for a Schmidt corrector plate, that is, a magnification of the optical profile to be produced on the plate. The magnification factor of the mould surface profile is suitably between 10 and 50. A blank B of glass, or other suitable light-transmissive material, is placed with one surface facing and in contact with the block M. The gap thus formed between the blank B and the mould surface S due to the profile of the latter is then filled with a resinous material R whose properties are that it shrinks on curing by a predetermined amount (e.g. 2–3%), and also adheres to both the blank B and the block M (whose relevant surfaces are previously treated in known manner if necessary) sufficiently well to prevent the bond being broken under the pressure exerted in a direction normal to the blank B due to shrinkage of the resinous material as it cures. When the resinous material has cured, the blank B is deformed as shown and the lower surface Bs of the blank B now has a profile which is in direct inverse proportion to the shrinkage factor of resinous material R and the profile of the mould surface S. With the blank B in a condition of induced stress due to its deformation, a rigid block D (see FIG. 2) is placed over the blank B and the upper surface Bs' of the blank B is secured to the facing surface Ds of the block D. Suitably, the same type of resinous material as the resinous material R is used to secure the blank surface BS' to the block surface Ds, this resinous material R' being coated over the blank surface Bs' before the block D is placed in position.

Figure 4:

When the resinous material R' has cured, the blank B, with the block D secured to it, is separated from the mould M (see FIG. 3) by the discrete application of a force specifically higher than the force of adhesion between the cured resinous material R and the blank surface Bs, or by other means such as the application of heat depending on the type of resinous material used. After this separation, the blank B is held deformed by its continued adhesion to the (supporting) surface Ds. The exposed surface Bs of the blank B is now ground and polished flat to the surface Bg, after which the blank B is released from the block D in a similar manner to its release from the mould M. On release, the blank B restores from its deformation and the worked (previously flat) surface Bg assumes the optical profile for a Schmidt corrector plate as shown in FIG. 4.

For optical elements whose final curvature is steep, e.g. for large aperture ($f1.0$ below) Schmidt corrector plates, the blank B will need to be thin, e.g. 1 mm thickness for an $f1.0$ corrector plate. Therefore, for such optical elements intended for applications which require mechanical durability, a flat light-transmissive supporting plate H (e.g. of glass) may be bonded to the flat surface of the final element using a transparent resin (see FIG. 4).

The combination of the percentage shrinkage of the resinous material R and the magnification factor of the mould surface profile should be such as not to cause deformation of the blank B beyond its elastic limit.

The resinous material is suitably an epoxy resin and hardener, for example a bisphenyl A epoxy resin with an epoxy equivalent of 5 to 5.2 per kilo (such as CIBA, MY 750) and a hydroxyl alkylated polyamine hardener (such as HY 956). Such an epoxy resin undergoes a 2–3% shrinkage on curing.

The mould block M is suitably a rigid metal block on which the required profile of the mould surface S has been machined using conventional machining techniques.

The surfaces of the blank B, the mould B and the block D to which the resinous material is to adhere are preferably coated with a dry film release agent e.g. a mixture of waxes and silicones such as Rocol No. 7 prior to the moulding process. When using a release agent and epoxy resin and hardener of the above specific types, it has been found that separation of the various surfaces from the cured resin is readily effected by starting the release with a sharp wedge (e.g. a razor blade) and then peeling by hand.

It is preferred to use glass or glass-like substances (e.g. silicates) for the blank B because of their low thermal expansion co-efficients. Titanium silicate may be particularly attractive because it has a zero thermal expansion co-efficient between −50°C and +100°C. Rapid curing becomes possible with such a material because there would be no thermal distortion.

It can be seen from the foregoing description that the method according to the present invention is particularly advantageous for the manufacture of optical elements having an optical profile that is concave, or at least concave at its outer rim as in the case of a Schmidt corrector plate, because the surface Bs of the blank B is in contact with peripheral edge of the mould surface S. As a consequence, there is a satisfactory seal for maintaining the initially uncured resinous material M in the region between the mould surface S and the facing surface Bs of the blank B. For other mould surface profiles, it may be necessary to bound said region by a movable member as in the method according to said patent application Ser. No. 278,116.

What we claim is:

1. A method of manufacturing an optical element from a blank of light-transmissive material, characterized in supporting the blank with one surface facing and in contact or in proximity with a mould surface that has a profile which, in a direction normal to said one surface, is a magnification of a required optical profile for the optical element, filling the region between said surfaces with an adhesive resin material that shrinks on curing by a predetermined amount, causing the resin material to cure with it adhered to both said surfaces so that the blank is deformed, securing the other, outer, surface of the deformed blank to a supporting surface, releasing said one surface of the blank from the cured resin material, with the blank held deformed by said supporting surface, optically working flat said one surface of the blank, and releasing the worked blank from said supporting surface, the magnification factor of the mould surface profile being an inverse function of the percentage shrinkage of said resin material, but not being sufficiently large to cause deformation of the blank beyond its elastic limit.

2. A method as claimed in claim 1 characterized in that the mould surface of the mould employed is machined on one face of a rigid metal block.

3. A method as claimed in claim 1 characterized in that the mould employed has a mould surface profile having a magnification factor of between 10 and 50.

4. A method as claimed in claim 3 characterized in that a resin material is used that shrinks on curing by 2–3%.

5. A method as claimed in claim 4, characterized in that the resin material used is an epoxy resin.

6. A method as claimed in claim 1, characterized in that a blank of glass or glass-like substance is used.

7. A method as claimed in claim 6, characterized in that a blank of titanium silicate is used.

8. A method as claimed in claim 1, characterized in that a flat light-transmissive supporting plate is bonded to the flat surface of the worked blank.

9. A method as claimed in claim 1 characterized in that said outer surface of the blank is secured to said supporting surface by the same resin material as that used for the mould.

* * * * *